March 12, 1935.  A. MATTHEY-DORET  1,994,427
TRANSMISSION LINE PROTECTIVE SYSTEM
Filed June 15, 1932
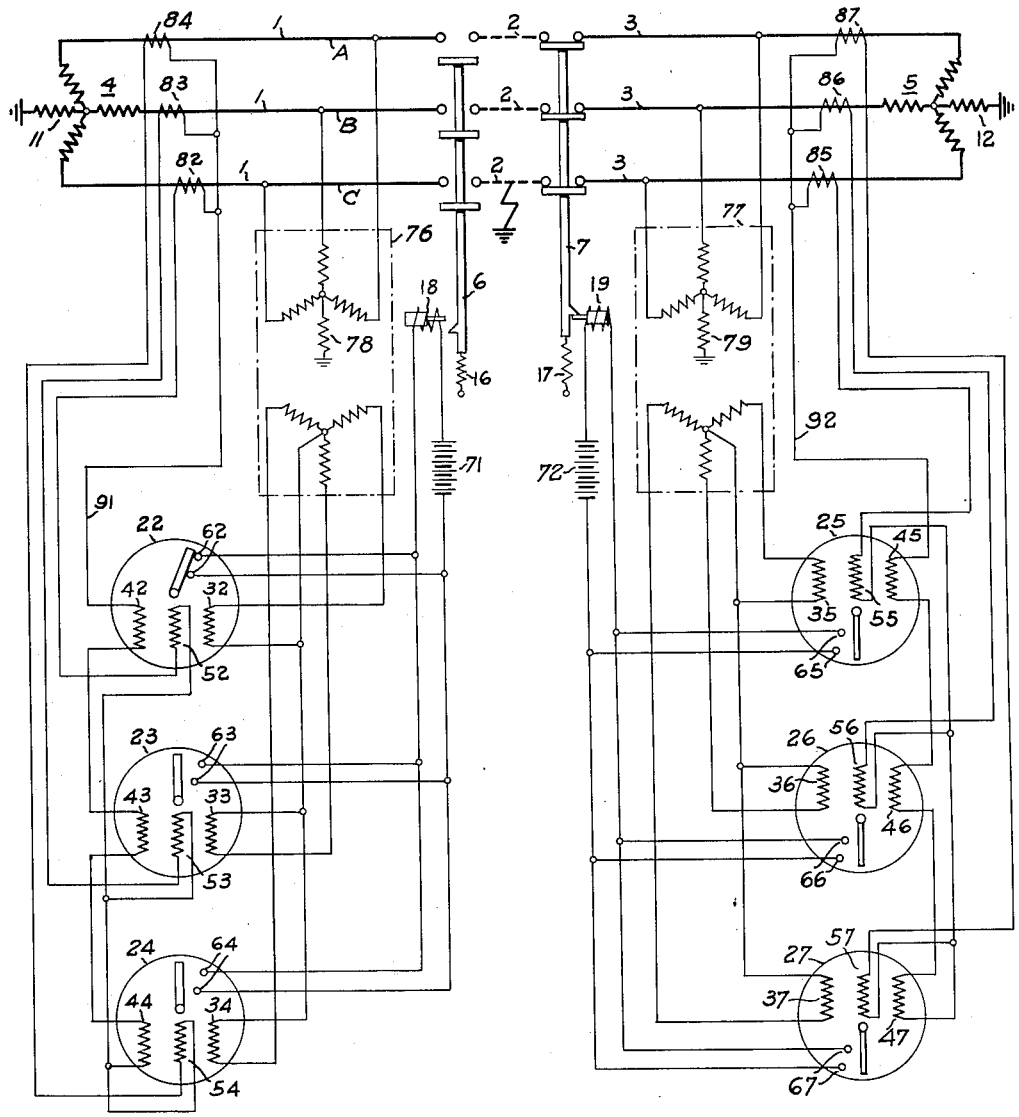
Inventor
A. Matthey-Doret
by G.J. Elvin
Attorney Patented Mar. 12, 1935

1,994,427

UNITED STATES PATENT OFFICE 1,994,427

TRANSMISSION LINE PROTECTIVE
SYSTEM

André Matthey-Doret, Baden, Switzerland, assignor to Aktiengesellschaft Brown Boveri & Cie., Baden, Switzerland, a joint-stock company of Switzerland Application June 15, 1932, Serial No. 617,284
In Germany June 15, 1931

8 Claims. (Cl. 175—294)

This invention relates to improvements in means for protecting electric lines from the action of continuing faults therein and more particularly to protective relay systems which operate circuit breakers selectively to isolate faulty line sections in dependence upon the impedance of the line to the fault point.

When relays operated in response to the impedance of a line are used for selectively operating circuit breakers to isolate faulty sections of an electric current distribution system, it has been found that the impedance measured by the relays is not a true function of the length of the line to the fault point, but is dependent also on the current distribution in the phases of the line. Unless the current distribution is, therefore, controlled the relays may operate improperly and may cause disconnection of line sections in perfect operating condition.

It is, therefore, an object of the present invention to provide an electric transmission line with such balanced impedances that the current in the sound phases, upon the occurrence of a fault in one or more of the phases, will remain at such value that an impedance relay associated with the faulty phase will cause opening of a circuit breaker thereby isolating the faulty line section.

Another object of the invention is to provide an impedance relay system for the selective protection of electric transmission lines in which the impedances are so balanced as to secure operation only of an impedance relay associated with faulty phases of the line to operate circuit breakers for isolating the faulty section of the line.

Objects and advantages other than those above set forth will be apparent from the following description when read in connection with the accompanying drawing which diagrammatically illustrates one embodiment of the invention in which a transmission line having two or more sections is provided with circuit breakers for isolating the respective sections upon the occurrence of a fault therein, the operation of the circuit breakers being controlled by impedance relays operating as may be illustrated by the system for resolving unsymmetrical coordinates into symmetrical coordinates having the same number of vectors.

Referring more particularly to the drawing by characters of reference, the reference numerals 1, 2 and 3 designate a plurality of sections of an electric transmission line supplied with current from electrical apparatus herein illustrated as generators 4 and 5. The several phases of the line sections 1, 2 and 3 are designated by the letters A, B, and C. The line sections are connected through circuit breakers 6 and 7 and the generators are grounded through reactance coils 11 and 12 connected with the neutral points thereof.

The circuit breakers 6 and 7 are normally retained in closed position against the action of tension springs 16 and 17 by means of electromagnetically operable latches 18 and 19 except upon the occurrence of a disturbance such as a ground fault or a fault between phases on any of the distribution line sections 1, 2 or 3. When such a fault occurs the latch 18 or 19 is tripped, depending on the location of the fault, by the operation of relays 22, 23, and 24 or 25, 26, and 27. The number of relays which will operate to cause tripping of the latches depends upon the character of the fault i. e., on the number of phases of the line sections involved and on the distance of the relays from the fault. The relays 22, 23 and 24, or 25, 26 and 27, may be sets of single phase relays as shown, or each set may be replaced by a unitary three phase relay, connected with the distribution line sections 1 or 3 as shown and to be described hereinafter.

The relays operate in response to the impedance of the line with which they are connected and in dependence upon the distribution of the current in the several phases of the line and preferably operate differently in dependence on the direction of energy flow, i. e., the relays preferably operate instantaneously in case of energy flow in one direction in the line section to which they are connected and operate only after a predetermined time delay upon the occurrence of energy flow in the line section in the opposite direction. Each of the relays comprises a potential coil indicated at 32 to 37; a current coil indicated at 42 to 47; a second current coil indicated at 52 to 57; and contacts indicated at 62 to 67, to be bridged upon energization of the several coils of the relays. The contacts of each set of single phase relays, or each three phase relay replacing such sets, are connected with sources of current 71 or 72 for the purpose of supplying current from such sources to the coil of the latch 18 or 19 upon bridging of the contacts of the several sets of relays as will appear hereinafter.

The potential coils 32, 33, and 34, inclusive, of the relays 22, 23 and 24, are connected with the several phases A, B, and C, of the distribution line section 1 by a star connected transformer 76 and the voltage coils 35, 36 and 37, inclusive, of the relays 25, 26 and 27, are connected with the several phases A, B, and C, of the distribution line section 3 by a star connected transformer 77. The neutral points of the primary windings of the transformers 76 and 77 are grounded through reactance coils 78 or 79.

The current coils 52, 53 and 54 of relays 22, 23 and 24, are connected in series with the secondary windings of current transformers 82, 83 and 84, connected with the several phases of the distribution line section 1 and the current coils 55, 56 and 57, of relays 25, 26 and 27, are connected in series with the secondary windings of current transformers 85, 86 or 87, connected with the several phases of the distribution line section 3. The current coils 42, 43 and 44, of relays 22, 23 and 24, are likewise connected with the several current transformers 82, 83 and 84, and the current coils 45, 46 and 47, of relays 25, 26 and 27, are connected with the several current transformers 85, 86 and 87. The coils 42, 43 and 44 are also connected in series by a conductor 91 with the neutral point of the secondary windings of the transformers 82, 83 and 84, and the coils 45, 46 and 47, are connected in series by a conductor 92 with the neutral point of the secondary windings of the current transformers 85, 86 and 87. The conductors 91 and 92, therefore, have the zero phase sequence current of the line flowing therethrough as will be explained hereinafter and such current, therefore, also flows through the coils 42 to 47 inclusive.

Upon the occurrence of a fault between the phases or between any of the phases and ground of either distribution line section the relay associated with the affected phase, or all of the relays associated with the affected line section, will close their respective contacts thus completing a circuit including the latch controlling the circuit breaker in the faulty line section and the source of current connected with the latch of such said circuit breaker.

The proper operation of impedance relays such as above described is facilitated if the currents flowing in the sound phases of a line are kept as low as possible, in case of grounding of one phase, for the purpose of avoiding operation of the relays associated with such sound phases. Such selective operation of the relays due to the minimizing of the current in the sound phases may be obtained as follows:

An unsymmetrical system of co-planar concurrent vectors may be resolved into a positive phase sequence vector system, a negative phase sequence vector system and a zero phase sequence vector system of the same number of vectors, the systems being symmetrical, according to the method developed by C. L. Fortesque (published in the Transactions of the American Institute of Electrical Engineers, vol. 37, beginning at page 1027). In case of a fault, the currents of a three phase system may be resolved into a positive phase system $I_d$, a negative phase system $I_i$, and a zero phase system $I_o$. In case of a ground in phase C of a line section, the resulting currents at the ground may be calculated from the following equation:

$$I_d = I_i = I_0 = \frac{E_c}{Z_p + Z_n + Z_0} \quad (1)$$

in which $E_c$ is the voltage induced in the apparatus by the phase C and $Z_p$, $Z_n$ and $Z_0$ are the resulting impedances for the positive phase system, the negative phase system and the zero phase system, respectively. The currents $I_d$, $I_i$ and $I_0$ distribute themselves in the line section at the grounded point dependent on the impedances $Z_p$, $Z_n$ and $Z_0$ of the line phases. At any point, the resulting phase currents may be calculated from the current components at such point as follows:

$$I_A = I_p + I_n - I_0$$
$$I_B = I_p \Sigma - j_{120} + I_n \Sigma j_{120} + I_0$$
$$I_C = I_p \Sigma - j_{240} + I_n \Sigma j_{240} + I_0 \quad (2)$$

The currents $I_p$ and $I_n$, the distribution of which is determined by the impedances $Z_p$ and $Z_n$, are approximately the same because the impedances differ somewhat only in the case of generators. In the following formula the impedance $Z_p$ for the generators is taken as the mean value of the actual impedances $Z_p$ and $Z_n$. For transformers and conductors $Z_p = Z_n$. To reduce the currents $I_B$ and $I_C$ to zero, the current relations must be as follows:

$$I_p = I_n = I_0 \quad (3)$$

Since the above equation is fulfilled at the fault point it is sufficient that the current $I_0$ be distributed in the line in the same manner as the currents $I_p$ and $I_n$ are distributed to secure the above relation for the whole line, i. e., the ratio $Z_0/Z_p$ must be constant throughout the entire system. The ratio $Z_0/Z_p$ for conductors approximates the value of four substantially continuously, but for sources of current supply such as grounded generators or transformers, the ratio varies widely and is generally materially less than for mere conductors.

However, if impedances are connected with the neutral point of electrical apparatus on the line, the ratio of $Z_0/Z_p$ may be made the same for the entire system and may be made approximately that for conductors. $Z_0$ must fulfill the above requirements not only in magnitude, but also in phase position. The neutral point impedances $Z_0$ and the impedances $Z_p$ generally must be inductances because $Z_0$ and $Z_p$ have about the same phase positions for conductors. In substations, the neutral points cannot be grounded particularly when rotating machines are present which might themselves supply current to the fault point because then $Z_p = Z_n = 0$. It will be understood that impedances may be connected in the line instead of with the neutral points of apparatus as shown or that the impedances of the line sections themselves may be adjusted by suitable means.

The requirement that the ratio $Z_0/Z_p$ be constant need not be strictly complied with as long as such results are substantially maintained because low currents in the sound phases will be without effect on the relays.

The current in the sound conductor of a single phase system may be kept low, upon the occurrence of a fault on the other conductor by a similar method.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a protective system for an electric transmission circuit, circuit breakers for dividing the circuit into a plurality of sections, means for establishing the ratio of the zero phase sequence impedance to the positive phase sequence impedance to an approximately constant value throughout the circuit, and a relay associated with each of said circuit breakers and with said circuit sections to cause disconnection thereof upon the occurrence of fault connections in the circuit, said relays operating in dependence upon the impedance of the circuit from the point of connection thereof to the point of the fault connection and in dependence upon the distribution of current in the circuit.

2. In a protective system for an electric transmission circuit, circuit breakers for dividing the circuit into a plurality of sections, means for establishing the ratio of the zero phase sequence impedance to the mean of the positive phase sequence impedance and the negative phase sequence impedance to an approximately constant value throughout the circuit, and a relay associated with each of said circuit breakers and with said circuit sections to cause disconnection thereof upon the occurrence of ground faults in the circuit, said relays operating in dependence upon the impedance of the circuit from the point of connection thereof to the point of fault connection and in dependence upon the distribution of current in the circuit.

3. In a protective system for a polyphase electric transmission circuit, circuit breakers for dividing the circuit into a plurality of sections, means for establishing the ratio of the zero phase sequence impedance to the mean of the positive phase sequence impedance and the negative phase sequence to an approximately constant value throughout the circuit, a plurality of relays associated with each of said circuit breakers and with said circuit sections to cause circuit opening operation of said circuit breakers upon the occurrence of faults in the circuit, said relays operating in dependence upon the impedance of the circuit from the point of connection thereof to the point of the fault connection and in dependence upon the distribution of current in the circuit.

4. In a protective system for a polyphase transmission circuit, circuit breakers for dividing the circuit into a plurality of sections, means for establishing the ratio of the zero phase sequence impedance to the positive phase sequence impedance to an approximately constant value throughout the circuit, and a relay operating on the impedance principle associated with each of the phases of the sections of said circuit and arranged to cause opening of said circuit breakers upon the occurrence of fault connections in a phase conductor of the associated section of said circuit, only the one of said relays associated with the faulty phase of the associated section and nearest the fault operating to cause opening of said circuit breaker associated therewith.

5. In combination with an electric circuit comprising a transmission line and a source of current connected with and supplying current to said line, of means for establishing the ratio of the zero phase sequence impedance to the positive phase sequence impedance of the circuit to an approximately constant value throughout the circuit.

6. In combination with an electric circuit comprising a transmission line and an electric generator connected with and supplying current to said line, of an inductance connected with said circuit so dimensioned as to establish the ratio of the zero phase sequence impedance to the positive phase sequence impedance of the said circuit to an approximately constant value throughout said circuit.

7. In combination with an electric circuit comprising a polyphase transmission line and a generator having a star connected armature winding connected with and supplying current to said line, of an inductance connected between the star point connection of said armature winding and ground so dimensioned as to establish the ratio of the zero phase sequence impedance to the positive phase sequence impedance of the said circuit to an approximately constant value throughout said circuit.

8. In combination with an electric circuit comprising a transmission line and a generator connected with and supplying current to said line, of means for adjusting the ratio of the zero phase sequence impedance to the positive phase sequence impedance of the said generator to the same value as the ratio of the zero phase sequence impedance to the positive phase sequence impedance of the said line.

ANDRÉ MATTHEY-DORET.